Sept. 13, 1927.

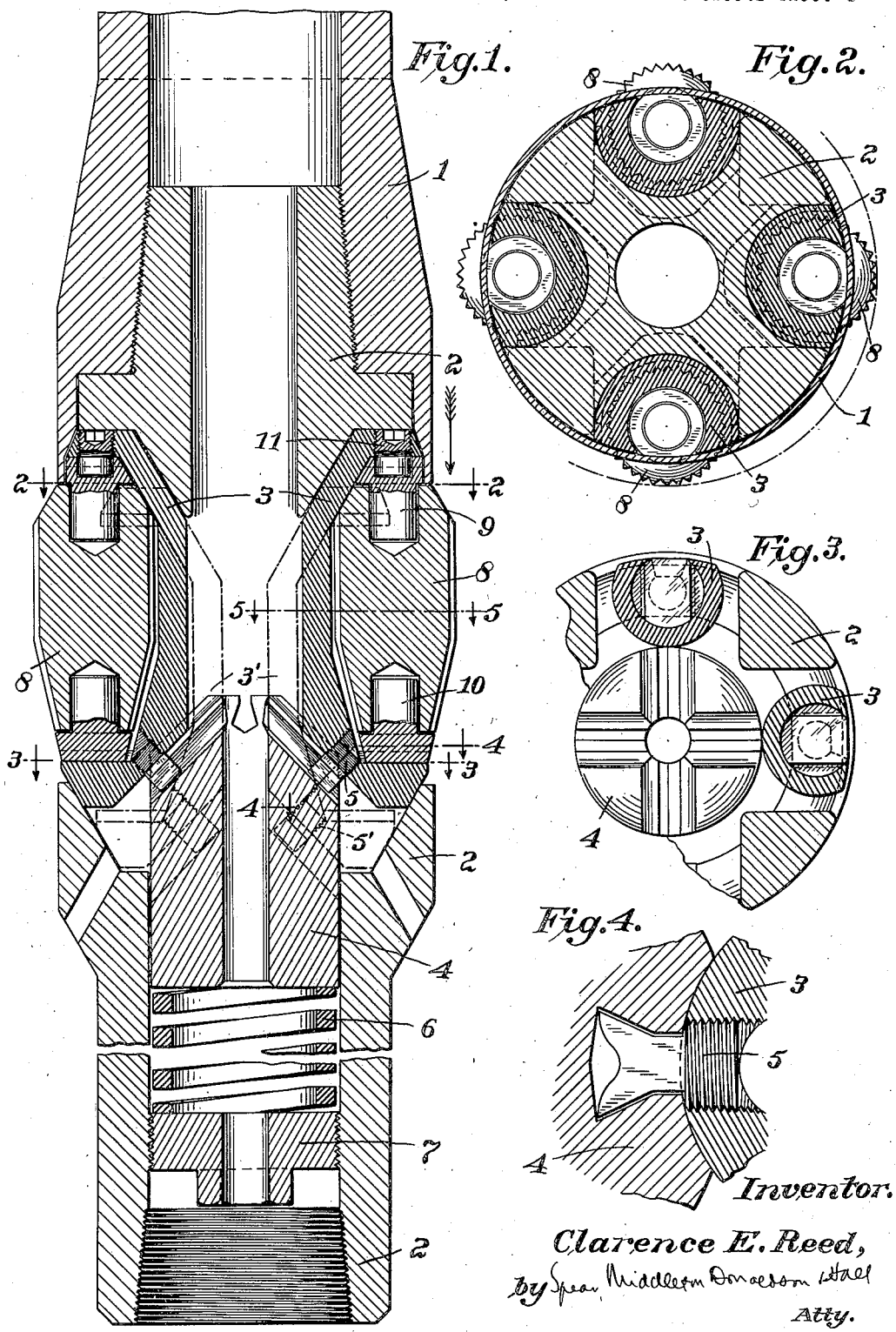

C. E. REED 1,642,463

DEEP WELL ROTARY DRILLING APPARATUS

Filed June 15, 1925 2 Sheets-Sheet 2

Inventor:
Clarence E. Reed,
by Spear, Middleton, Donaldson & Hall
Atty.

Patented Sept. 13, 1927.

1,642,463

UNITED STATES PATENT OFFICE.

CLARENCE E. REED, OF WICHITA, KANSAS.

DEEP-WELL ROTARY DRILLING APPARATUS.

Application filed June 15, 1925. Serial No. 37,188.

This invention relates to deep well rotary drilling apparatus and particularly the reaming of wells, and it concerns the features and combination and arrangement of parts therein as described and particularly pointed out in the claims. The invention is shown by way of example of the principles embodied therein in the accompanying drawings in which:

Fig. 1 is a vertical sectional view of the invention.

Fig. 2 is a sectional view on the line 2—2.

Fig. 3 is a sectional view on the line 3—3.

Fig. 4 is a sectional view on the line 4—4.

Figure 5:
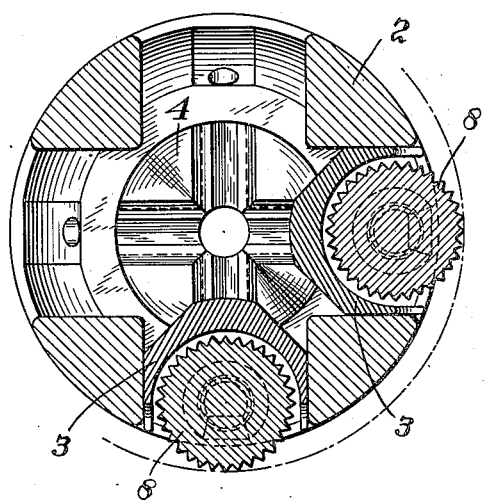
Fig. 5 is a sectional view on the line 5—5 with the cage in operating position.
Figure 6:
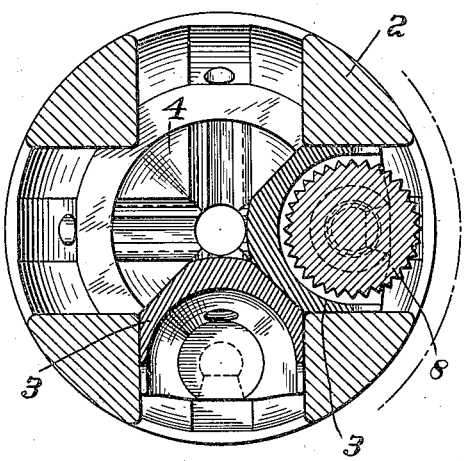
Fig. 6 is a sectional view on the line 5—5 with cage in dotted line position.
Figure 7:
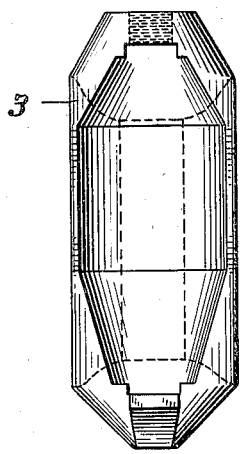
Fig. 7 is a view looking into the cage.
Figure 9:
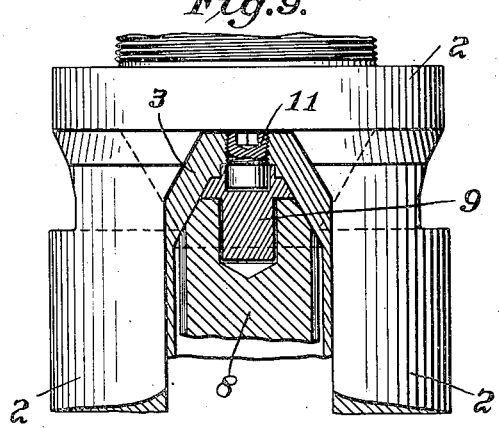
Figure 8:
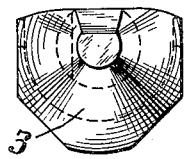
Fig. 8 is an end view of the cage.

Fig. 9 is a side view looking into the laterally open recess, cage 3, roller 8, bearing 9, and set screw 11 shown in section.

Figure 10:
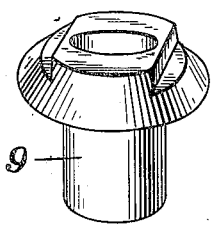

Fig. 10 is a perspective view of bearing 9.

In these drawings Fig. 1 indicates a rotatable body embodying the invention. 1 is the lower end of a collar member screw threaded on the shank of the rotatable body 2. The upper end of this collar is connected to the lower end of a hollow drill stem not shown. The drill stem at the surface is connected with the rotary machinery in the usual manner and the interior of the hollow drill stem is in connection with pumps circulating a fluid downwardly through the hollow drill stem in operation of the apparatus. The lower end of the collar has a counter bore extending down over the parts 3 and 9. The part 3 is shown in solid black lines in operating position and in dotted lines is shown the position 3, 4, and associated parts will assume under pressure applied in a downward direction on the beveled portion of the roller cutter 8, the direction of the pressure being indicated by an arrow. This pressure will usually be applied as the apparatus is being withdrawn from the well and enters a casing set in the well. 3 designates a cage in which is mounted a roller cutter with individual bearings 9 and 10 at each end. The bearings are in general of cylindrical form in body portion with a cylindrical stud projecting into the end of the cutter, the other end of the bearing provided with a tongue fitting a groove in the cage member 3. A hollow head plug 11 seated in the end of the cage 3 holds the bearing 9 in place. In the drawing a plug 11 is shown only at the top of the cage 3. This construction may be duplicated at the lower end of the cage if desired. The roller 8 and bearings 9 and 10, are assembled in the cage 3 and retained by the plug 11, after which the assembly is handled as a unit. The lower portion of 3 rests on the body 2 at the outside and at its inner side 3 rests on the cone shaped end of cylindrical member 4. The conical upper end of 4 is grooved on a radius to receive and center the cage 3 in the recess, this groove construction being illustrated in Fig. 4. The cylindrical member 4 is capable of movement up and down in a bore of the body 2. Provision is made for ample movement of 4 under pressure so it may drop low enough to permit 3 to assume the position shown in dotted lines. The lower portion of body 2 is made long enough to provide space in the bore below the member 4 for a coil spring 6 and below the coil spring a cap member 7 threaded in the lower end of the bore, and arranged to take a wrench for adjustment of the cap to regulate the tension of the spring. The member 4 and the cap member 7 are each bored, or provided with a passageway for the circulation of fluid through them. The lower end of the body 2 is finished to provide a connection for attachment of any tool that may be desired below. A dove-tail groove is shown cut the length of the cone shaped end of the member 4 to receive a dove-tail dowel 5, the other end of which is connected with cage 3. The end of the dowel in the cage 3 may be riveted, or threaded, or if desired, the hole in 3 may be reamed out to receive a nut attached by a threaded end of the dowel. The purpose of 5 is to prevent the cage 3 from tipping forward at its upper end while in the position indicated in dotted lines, in the event the pressure on the roller 8 is suddenly removed. 5 is a guide or retainer. In lieu of this construction a fin may be formed on the upper portion of the cage 3, the fin to lay in a radial groove cut on the same center line and in the slot in the body member 2 and act as a guide, center, and a retaining means of the cage 3.

In assembling this device, as previously stated, the roller and bearings would be assembled in the cage 3 and handled as a unit. The unit would be dropped into the recess of the body 2 with the collar 1 removed and the member 4 in low position. The collar 1 would then be put in place, the spring 6 arranged under 4, and the plug or cap screwed in below the spring and adjusted to raise member 4 to expand 3 to operating position. It will, of course, be understood the spring may be omitted when underreaming is not desired and the cage held rigidly at fixed cutting diameter. The pressure of operating load would be in reverse direction to the arrow shown at the outside of the figure, which would carry the thrust upwardly against the solid body portion 2. The spring below the member 4 would be a heavy spring capable of carrying its portion of the operating load without deflection. As some sand may be required to be handled at times a drain hole is shown in the body 2 leading outwardly from the bottom of the recess. When circulation is not desired thru the body at this point the periphery of 4 may be corrugated and fluid will drain into the lower part of the body.

In Fig. 9 the body is shown under cut all around below the flange-like portion below the threaded shank. If desired, the lines of the main body may be cylindrical and undercut only enough at the end of the recess to permit the entrance of cage.

For insertion in a well casing the rollers will be collapsed by pressure applied by workman on the derrick floor and the cutters will automatically expand to operating position when the apparatus passes out of the lower end of the casing in the well.

It will be understood that the above description and the drawings accompanying the same are to be regarded as illustrative of my invention and not as restrictive upon the scope of my invention which is defined by the appended claims.

It will be noticed that the upper and lower ends of the cage or carrier for the reamer roller fit in what may be termed sockets formed at the top by the parts 1 and 2 and at the bottom of the carrier by the recess 2ᵃ in the body 2.

This lower socket has an inclined wall parallel with the inclined wall bounding the upper part of the laterally extending slot or recess in which the cage or carrier is mounted, so that the carrier is guided between these parallel inclined walls.

It will be observed further that the upper part of the member 2 has a horizontally extending flange with a flat horizontal under surface against which the upper end of the cage or carrier abuts. This part of the rugged or comparatively massive head sustains the thrust. The flange of the member 1, which flange embraces the cage, serves merely to retain said cage at its upper end within the recess and it is not relied on to sustain the thrust.

I claim:

1. In combination in a deep well drilling apparatus, a body having a central bore for flushing fluid and slots opening laterally and also opening into said bore, carriers mounted in the slots, the inner sides of said carriers constituting the wall of said bore to direct the fluid through the bore and prevent the escape of said fluid through the said slots, reamer rollers mounted in the carriers, and resilient means for forcing the carriers outwardly, substantially as described.

2. In combination in a drilling apparatus, a body having a laterally open recess bounded by upper and lower parallel walls inclining upwardly and outwardly, a carrier mounted in the recess and guided at its top and bottom portions by said inclined guide walls, a reamer roller mounted in the carrier and means for exerting pressure upon the carrier to force the same outwardly along said inclined walls, substantially as described.

3. In combination in a deep well drilling apparatus, a body having laterally open recesses with an inclined guide wall and having a horizontal portion presenting a horizontal thrust resisting surface at the upper part of the recess, a carrier guided by the inclined wall of the recess. a reamer cutter mounted in the carrier. said carrier when in its outermost position finding a thrust bearing against said surface and a collar mounted on the body and having a flange extending down over the upper end of the carrier, and resilient means for forcing the carrier upwardly and outwardly along the inclined wall, substantially as described.

4. In combination in a deep well drilling apparatus, a body having recesses with inclined guide walls, carriers slidably guided in said recesses, reamer rollers mounted in said carriers, a center member having a cone shaped upper end bearing on the carriers and a spring for forcing said center member upwardly to force the carriers outwardly, and a slidable dove-tailed interlocking connection between the carrier and the conical member to prevent tipping of the carrier, substantially as described.

5. In combination in a deep well drilling apparatus, a body having laterally open recesses with upwardly and outwardly inclined guide walls, carriers in the recesses guided by said walls, a center member having radial guide grooves, means on the carriers interlocking with the walls of said radial guide grooves to prevent the carriers from tipping, and means for exerting pressure upon the center member, substantially as described.

6. In combination in a deep well drilling apparatus, a body having a laterally open recess, a carrier in said recess having upper and lower bearing portions, a reamer roller located between said bearing portions, removable bearings insertable laterally between said bearing portions, a member extending through the end of said carrier to hold one of the removable bearings in place, a roller mounted on the removable bearings, and means for holding the carrier with the roller in working position, substantially as described.

7. In combination in a deep well drilling apparatus, a body member having laterally open recesses with inclined guiding walls, carriers slipped laterally into said recesses, rollers with their bearings slipped laterally into the carriers, and means for holding said bearings and rollers within the carriers, said rollers and bearings being slipped into place in the carriers as one body and the rollers and carriers being slipped as one body into the body member.

8. In combination in a deep well drilling apparatus, a body member having laterally open recesses with inclined guiding walls, carriers slipped laterally into said recesses, rollers with their bearings slipped laterally into the carriers, and means for holding said bearings and rollers within the carriers, said rollers and bearings being slipped into place in the carriers as one body and the rollers and carriers being slipped as one body into the body member, and a collar having a flange to hold the carriers in place, substantially as described.

9. In combination in a deep well drilling apparatus, a main body member having lateral recesses, carriers in the recesses, reamer rollers having upper and lower removable bearings insertable with said rollers into the upper and lower portions of the carriers as one body, and said carriers insertable into the recesses with the rollers and their bearings as one body and means for retaining the carriers in place, substantially as described.

10. In combination in a deep well drilling machine, a main body having a laterally open recess, a roller cutter having sockets at its ends, bearings independently and removably mounted in said sockets, seats for removably receiving said bearings in the recess of the main body, and means for removably holding one of said bearings to the body, substantially as described.

11. In combination in a deep well drilling machine, a main body having a laterally open recess, a roller cutter having sockets at its ends, a bearing removably mounted in each socket, means for removably receiving said bearings in the recess of the main body, and means for removably holding one of said bearings to the body, said means comprising a collar removably connected to the body and having a depending flange for retaining said bearing member against lateral movement with respect to the main body, substantially as described.

12. In combination in a deep well drilling apparatus, a main body having a recess, a member for holding a roller cutter to be inserted into or removed from said recess as one body, a bearing removably engaging the roller at each end, and each bearing being removably mounted in the holding member, a pin for retaining one of the bearings in the holding member, and removable means for retaining the holding member within the recess, substantially as described.

13. In combination in a deep well drilling apparatus, a body having a recess with an upwardly and outwardly inclined upper wall facing outwardly, and a lower wall inclining upwardly and outwardly and facing inwardly, a carrier in the recess having its upper portion guided by the upper inclined wall, and its lower portion retained and guided by the lower inclined wall, a reamer roller mounted in the carrier, and detachable means on the body for retaining the carrier within the recess at the upper part thereof.

14. In combination in a deep well drilling apparatus, a body portion having a recess opening outwardly through the face thereof, a roller cutter, a carrier for said roller cutter, independent bearing members one at each end of the roller each independently engaging the same removably and seated in the carrier, and means for holding one of said bearings in place.

15. In combination with a body member having a pocket opening out through its face, a cage in the pocket and bearings to be slid into said cage at the opposite ends thereof and in a direction radial to the axis of said cage, a roller mounted in said bearings and means for holding the bearings in the pocket.

16. In deep well rotary drilling apparatus, a rotatable body having laterally open recesses with inclined guiding walls, cages slidably mounted in the recesses and guided by said inclined walls, a vertically movable member mounted centrally of the body, a spring for pressing said member upwardly, said member having radially sliding substantially dove-tailed interlocking connections with said cages to prevent tipping of the cages.

17. In deep well rotary drilling apparatus, a rotatable body having laterally open recesses with inclined guiding walls, cages mounted in the recesses and guided by said inclined walls, a vertically movable member mounted centrally of the body, a spring for pressing said member upwardly, said member having radially sliding tongue and groove connections with said cages, and said member being longitudinally perforated to permit flow of flushing fluid.

18. In deep well drilling apparatus, a body member having laterally open recesses, each recess having an upper wall inclining upwardly and outwardly and facing outwardly, and a lower wall inclined upwardly and outwardly and facing inwardly, cages mounted in said recesses, each having at its inner side an upwardly and outwardly inclined upper surface, and an upwardly and inwardly inclined lower surface, said cages each having a lower outer side inclined to conform to the lower wall of each recess, a centrally disposed block having a conical upper surface bearing upon the lower inner inclined surfaces of the cages, a spring forcing said block upwardly, an interlocking sliding connection between the block and each cage, an abutment surface on the body member for the upper end of each cage, and a collar removably secured to the body and having a depending annular flange to retain the cages in the recesses.

19. In combination in deep well drilling apparatus, a reamer body having laterally open recesses defined by parallel plane side walls, cages having corresponding plane faces to bear on said plane walls, inclined walls in the recesses against which inclined faces of the cages work, means for pressing said cages outwardly having a sliding interlocking connection with the lower parts of said cages for retaining them in the recesses and means engaging the upper parts of the cages for retaining them in said recesses, substantially as described.

In testimony whereof, I affix my signature.

CLARENCE E. REED.